United States Patent Office 3,488,430
Patented Jan. 6, 1970

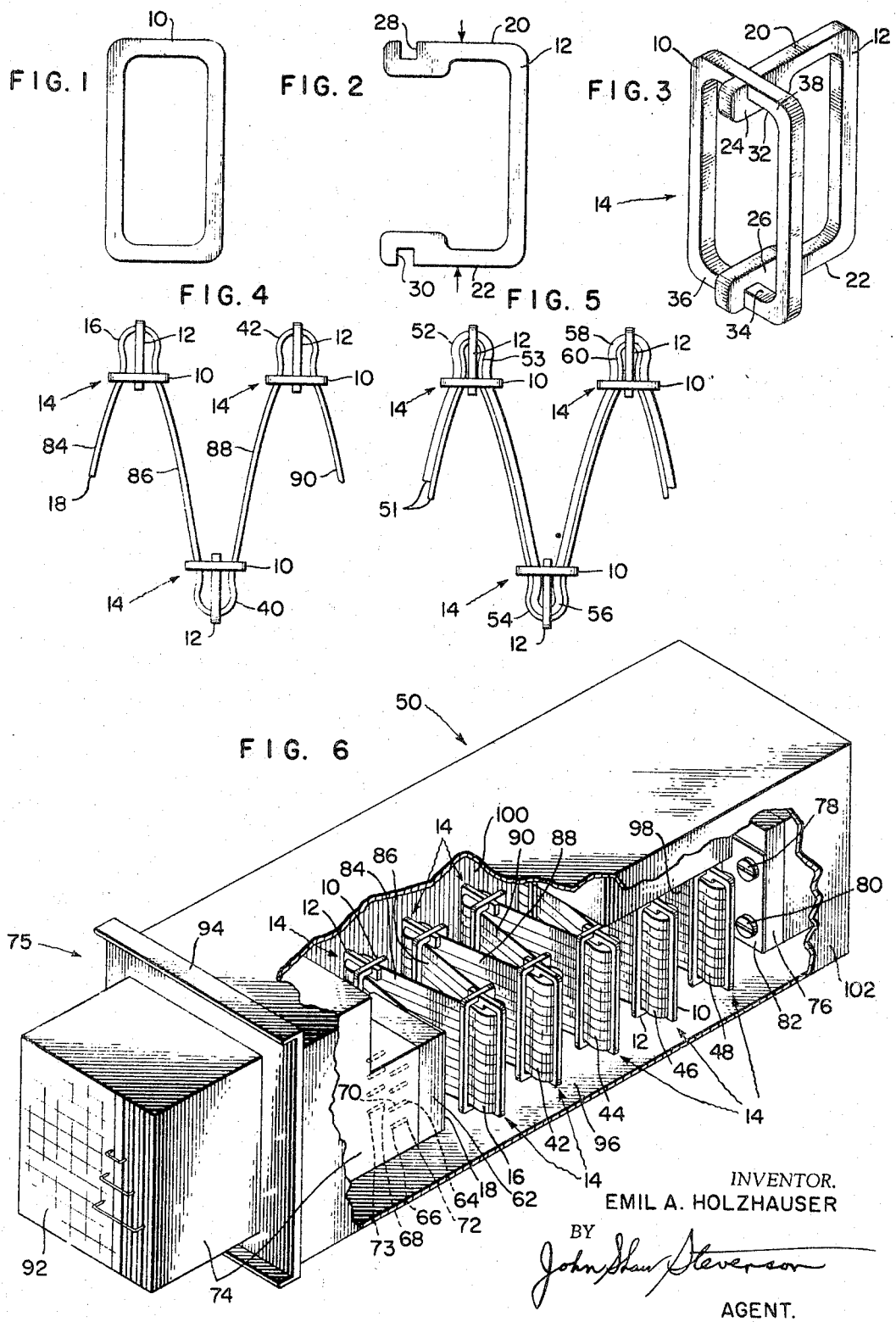

3,488,430
RETRACTABLE CABLE FORMING CLIP
Emil Andrew Holzhauser, Harleysville, Pa., assignor to Honeywell Inc., Minneapolis, Minn., a corporation of Delaware
Filed Dec. 13, 1967, Ser. No. 690,311
Int. Cl. H01b 7/18, 7/06
U.S. Cl. 174—69                    10 Claims

ABSTRACT OF THE DISCLOSURE

A two piece supporting apparatus is employed that can be readily mounted at spaced apart intervals along a ribbon cable to accommodate the loose passage of open loop portions of the cable therein and to enable the courses of cable formed between these loop portions to be neatly compressed against one another so that the cable will take up a minimum amount of space when placed in a retractable position within a casing and which will act as armor to protect the cable from rubbing against the casing during expansible movements out of and contractable movements back into the casing.

---

Prior to the present invention it has been the practice to fixedly clamp each of the loop portions of a retractable cable in order to retain it in a more compact state. It has also been the practice to provide flexible members along the zig-zag courses that extend between successive clamped loop portions of the cable in order to properly distribute stresses in the cable that arise due to the cable restraining action of the clamps.

It is therefore a major object of the present invention to disclose a simple two piece supporting apparatus which can readily be sprung into an assembled position with one another which do not require the use of the aforementioned cumbersome flexible members along the portions of the cable that extend between the loops.

It is another object of the present invention to disclose a two piece supporting apparatus for a retractable cable which can be assembled on each loop of the cable to accommodate the loose passage of at least one layer of a multiple conductor ribbon cable therein.

It is another object of the present invention to construct the aforementioned two piece supporting apparatus of a resilient plastic sheet or molded material, e.g., trade named nylon or polypropylene.

The National Electrical code of the National Fire Protection Association require that multi-ribbon cable be kept out of rubbing contact with any surface when it is moved between an expanded and a contracted condition in order to prevent the destruction of the insulation about its conductors.

It is therefore another object of the present invention to disclose a two piece supporting apparatus of the previously mentioned type for a cable that will slide along the surface, e.g., a casing and thereby protect the looped portions and the courses of the cable that extend between adjacent loops from chafing with the wall of the casing when this cable assembly is being expanded during its removal from a casing and when the cable assembly is being moved back into its compact position within the casing.

It is another object of the present invention to disclose an apparatus that can accommodate single as well as multiple layers of a non resilient cable, ofttimes referred to as ribbon cable.

It is another object of the invention to disclose a two piece supporting apparatus for a retractable cable which is of a drawbridge configuration and which can be beneficially employed in either a vertical or a horizontal position.

A better understanding of the present invention may be had from the following detailed description when read in connection with the accompanying drawings in which:

FIGURE 1 shows one part of the two piece cable supporting apparatus;

FIGURE 2 shows the other part of the two piece cable supporting apparatus;

FIGURE 3 shows the two piece cable supporting parts in an assembled condition;

FIGURE 4 shows how the two piece supporting apparatus is mounted on a single cable such as a ribbon cable;

FIGURE 5 shows how the same two piece supporting apparatus is mounted on two cables such as a double layer ribbon cable and;

FIGURE 6 shows how the two piece cable supporting apparatus disclosed in FIGURES 1 and 2 can be mounted on the loops of a ribbon cable so that the cable can be retained in a compact position when the movable part to which the slidable left end of the cable is attached is moved into a casing from its present position or can readily be expanded out of the casing when the left end is moved in an outward direction from its present position.

Each of the two parts 10, 12 forming the supporting apparatus 14 is made of either a sheet or molded material which is preferably of a good bearing long wearing construction such as the materials known in the trade, e.g., nylon, Teflon or polypropylene.

The first part 10 is of a rectangular picture frame shape configuration. This first part 10 is slipped over a first loop 16 formed in a cable 18 in the manner shown in FIGURES 4 and 6. The second part 12 of the supporting structure 14 is then slid over the round top part of the loop 16. Pressure is then applied by the first and third finger of the assembler to compress opposite surfaces 20, 22 of part 12 toward one another in the direction of the arrows shown in FIGURE 2. This will permit the U-shaped ends 24, 26, which form slotted walls 28, 30, to be moved through the wall surfaces 32, 34, and snapped into spring bias engagement with the portion 36, 38 of the first part 10.

All of the single loops 40, 42, 44, 46, 48 including those loops not shown which are located at the far side of the casing 50 behind the supporting apparatus 14 shown in FIGURE 6 are loosely surrounded by the supporting apparatus 14 so that each of these loops can flex.

It should be understood that although FIGURES 4 and 6 show the use of a non resilient multi-conductor ribbon cable that other different types of cables such as the dual layer cable 51 shown in FIGURE 5 can be employed with equal advantage to support its dual loops 52, 53; 54, 56; 58, 60.

Each conductor that forms the front end of the multi-ribbon cable 18 shown in FIGURE 6 is attached by means of a terminal connector 62 having sockets for example, 64, 66, 68 for receiving electrical prong connections for example 70, 72, 73 that are formed in a removable portion 74 of a recorder 75.

The back end of the multi-cable 18 shown in FIGURE 6 is retained against movement to a wall 76 that forms a stationary part of the back end of casing 50 in any suitable manner by, for example, the screw connectors 78, 80 and plate 82.

When it is required to remove the recorder portion 74 by pulling it in a forward direction out of casing 50 away from the position shown in FIGURE 6 all the loops in the cable e.g. 16, 40, 42; 44, 46, 48 will be allowed to flex in their associated support members 14 so that no undesired strain will be introduced into loops or in any of the substantially straight course portions e.g. 84, 86; 88, 90 extending between each successive pair of the aforementioned loops.

Experimentation has also shown that while the portions 74 of the recorder 75 is being pushed from its present position into the recording casing 50 to a position where its face 92 is flush with the front face of the casing 94 no stress will occur in its loop portions e.g. 16, 40; 42, 44; 46, 48, or in the course portions e.g. 84, 86; 88, 90 which extend between these loops because of the loose fit that is present between the protective members 14 and each of these loop portions 16, 40; 42, 44, 46, 48.

It can also be seen that the courses of cable that extend between its successive loop portions can be moved into a much more compact condition that has heretofore been possible when the previously mentioned flexible course members and retaining clamps were employed as a cable retaining means.

While the removable portion of the recorder 74 is moved back and forth out of and into the case 50 it can be seen that the edges 22 and 20 of the C-shaped portion of the supporting apparatus 14 will ride along their associated top surface 96 of the base of casing 50 and the underside surface 98 of the roof of the casing 50 and thereby protect the lower and top edges of the cable 18 from being brought into chafing contact with these casing surfaces 96, 98.

While the removable portion of the recorder 74 is moved back and forth out of and into the case 50 it can be seen that the edge 20 of the C-shaped portion of the supporting apparatus 14 will ride along the inner surface of the side wall surfaces 100, 102 of casing 50 and thereby protect the loop portions of the cable, for example 16, 40; 42, 44; 46, 48 against chafing contact with these surfaces 100, 102.

It should be further understood that a similar type of beneficial effect can be gained as that just described when the supporting apparatus 14 is used for a cable that is positioned in a vertical drawbridge position rather than being used in the horizontal position as shown in FIGURE 6.

The embodiments of the invention in which an exclusive property or privilege is claimed are defined as follows:

1. An apparatus maintaining at least one portion of a retractable cable in an open loop shaped configuration, comprising a first member having a wall forming an aperture therein, the wall surrounding the outer surface of each loop, a C-shaped member constructed of a resilient material surrounding another outer surface of each loop and being in engagement with said first member, the resiliency of each of said C-shaped members being operable to retain them in engagement with opposite inner wall portions of their first members with which they are associated.

2. The apparatus as defined in claim 1 wherein the first member is of a rectangular shaped configuration and the wall forming the aperture is rectangular.

3. The apparatus as defined in claim 1 wherein each of the members are constructed of polypropylene to provide a resilient bearing for each loop.

4. The apparatus as defined in claim 1 wherein the outer surfaces of each pair of members are relatively positioned with respect to one another forming protective surfaces along which the cable can be supported for movement in spaced apart relationship with a supporting surface without chafing.

5. The apparatus as defined in claim 1 wherein the portion adjacent the open end of each C-shaped member protrudes between the inside surfaces of the loop.

6. The apparatus as defined in claim 1 wherein additional pairs of first and C-shaped members are employed maintaining at least one other portion of the cable in a looped shaped configuration and in spaced relationship along the cable with respect to the first mentioned loop, the outer surface of said first and other of said looped portions providing a protective bearing surface along which the loop portions and the outer edges of the cable extending between the loops can slide along the wall portions of a casing without chafing when the cable is expanded during its removal from the casing and contracted during the movement of the cable back into a compact position within the casing.

7. The apparatus as defined in claim 1 wherein the opening defined by the walls forming each of the first and C-shaped members are constructed to accommodate the passage of at least one single layer of multiconductor cable therethrough.

8. The apparatus as defined in claim 1 wherein the outer wall of each C-shaped member has a pair of spaced apart slotted out surface portions accommodating the retension of the resilient C-shaped member with said opposite inner wall portions of the first member with which it is associated.

9. The apparatus as defined in claim 1 wherein the members accommodating the loose passage of at least one layer of multi-conductor ribbon cable therethrough.

10. The apparatus as defined in claim 1 wherein the first and C-shaped members are in spaced apart relationship with the retractable cable passing therethrough, said spaced apart relationship of the first and C-shaped members permitting flexure of the looped portion of the cable to take place when the ends of the cable are moved between a retracted and an expanded position.

References Cited

UNITED STATES PATENTS 2,865,979   12/1958   Klassen _____ 174—69

DARRELL L. CLAY, Primary Examiner

U.S. Cl. X.R.

174—52; 312—273